United States Patent
Fernandez et al.

(10) Patent No.: US 10,136,327 B1
(45) Date of Patent: *Nov. 20, 2018

(54) LOCATION VERIFICATION BASED ON ENVIRONMENTAL SENSOR DATA

(71) Applicant: United Services Automobile Association (USAA), San Antonio, TX (US)

(72) Inventors: Amanda S. Fernandez, San Antonio, TX (US); Rick Swenson, Bradenton, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,213

(22) Filed: Mar. 13, 2018

Related U.S. Application Data

(63) Continuation of application No. 15/643,105, filed on Jul. 6, 2017, now Pat. No. 9,967,750.

(60) Provisional application No. 62/367,890, filed on Jul. 28, 2016.

(51) Int. Cl.
*H04W 12/12* (2009.01)
*G07C 9/00* (2006.01)
*H04W 12/08* (2009.01)
*H04M 1/725* (2006.01)
(Continued)

(52) U.S. Cl.
CPC .......... *H04W 12/12* (2013.01); *G06N 99/005* (2013.01); *G07C 9/00182* (2013.01); *H04M 1/72569* (2013.01); *H04W 4/025* (2013.01); *H04W 12/08* (2013.01); *G07C 2009/00793* (2013.01); *H04M 2250/12* (2013.01)

(58) Field of Classification Search
CPC .. H04W 12/12; G06N 99/005; G07C 9/00182
USPC .................................................. 340/5.7–5.74
See application file for complete search history.

(56) References Cited

U.S. PATENT DOCUMENTS

| 8,031,085 B1 | 10/2011 | Anderson | |
| 9,510,357 B1 * | 11/2016 | Egner | ................... H04W 48/18 |
| 2008/0114501 A1 | 5/2008 | Wu | |

(Continued)

OTHER PUBLICATIONS

Mujibiya, "Haptic Feedback Companion f or Body Area Network Using Body-Carried Electrostatic Charge," Rakuten Institute of Technology, Rakuten Inc., Tokyo, Japan, 2015, pp. 571-572.

*Primary Examiner* — Allen T Cao
(74) *Attorney, Agent, or Firm* — Fish & Richardson P.C.

(57) ABSTRACT

Techniques are described for determining and/or verifying the location of a device based on environmental data. A device may provide location information describing its location, e.g., determined using a satellite-based navigation system. Environmental context data (e.g., temperature, air pressure, air quality, pollen count, ambient light, etc.) may also be received from the device, having been generated by sensor(s) incorporated into the device. The environmental context data may be compared to corresponding elements of other context data that is generated independently of the device. Based on the comparison, a confidence metric may be determined that indicates a level of confidence that the device's communicated location is its actual location. The confidence metric may be employed to make a security determination regarding a user of the device.

20 Claims, 5 Drawing Sheets

(51) Int. Cl.
 *H04W 4/02* (2018.01)
 *G06N 99/00* (2010.01)

(56) References Cited

U.S. PATENT DOCUMENTS

| | | |
|---|---|---|
| 2015/0137936 A1 | 5/2015 | Baldwin |
| 2015/0287296 A1 | 10/2015 | Hall |
| 2015/0296480 A1 | 10/2015 | Kinsey |
| 2016/0109951 A1 | 4/2016 | Baldwin |
| 2016/0179877 A1 | 6/2016 | Koerner |
| 2016/0292584 A1* | 10/2016 | Weinberg ............... G06N 7/005 |
| 2016/0360336 A1 | 12/2016 | Gross |
| 2016/0360382 A1 | 12/2016 | Gross |

\* cited by examiner

LOCATION VERIFICATION BASED ON ENVIRONMENTAL SENSOR DATA

CROSS-REFERENCE TO RELATED APPLICATIONS

This application is a continuation application of and claims priority to U.S. application Ser. No. 15/643,105, filed on Jul. 6, 2017, which is related to, and claims priority to, U.S. Provisional Patent Application Ser. No. 62/367,890, titled "Location Verification Based On Environmental Sensor Data," which was filed on Jul. 28, 2016, the entirety of which are incorporated by reference into the present disclosure.

BACKGROUND

Organizations and individuals that operate and/or manage computing systems may implement various security measures to prevent unauthorized individuals, devices, and processes from accessing secured data stored on the systems, gaining control of processes executing on the systems, introducing new (e.g., malicious) processes to the systems, and/or gaining access for other purposes. Moreover, security measures may be implemented to control access to a home, office space, or other secure area. Traditionally, a user may provide one or more credentials to gain access to a system or secure area. Such credentials may include a username, password, and/or personal identification number (PIN). By comparing the supplied credentials with previously established credentials for the user, a determination may be made whether to permit or deny the requested access. In some instances, tokens such as cryptographic keys may be employed to authenticate an individual and/or verify that an individual or process is authorized to access a system. Cryptographic keys may also be employed to secure communications over a network. In some instances, location information may be used, in conjunction with other information, to authenticate a user and/or determine whether a user, device, and/or process is authorized to access secure information.

SUMMARY

Implementations of the present disclosure are generally directed to determining and/or verifying the location of a computing device. More specifically, implementations are directed to determining and/or verifying the location of a computing device based on a correspondence, or lack thereof, between environmental context data generated by sensor(s) of the device and an environmental model of the purported location of the device.

In general, innovative aspects of the subject matter described in this specification can be embodied in methods that include actions of: receiving location information indicating a location of a user device associated with an individual; receiving environmental context data generated by one or more sensors of the user device, the environmental context data describing one or more environment factors in proximity to the user device; determining a confidence metric that indicates a level of correspondence between the environmental context data and baseline context data that describes a typical value for each of the one or more environment factors at the location, the other context data generated independently of the environmental context data; and responsive to the confidence metric being at least a threshold value, communicating an access signal indicating that the individual is authorized to access a secure area.

Implementations can optionally include one or more of the following features: the location is in proximity to a secured door controlled by an access control mechanism; the access signal is sent, to the access control mechanism, to instruct the access control mechanism to open the secured door; the access signal is sent, to the user device, to instruct an application executing on the user device to provide access to the individual; the one or more environment factors include one or more of temperature data, air pressure data, air quality data, pollen data, or ambient light data; determining the confidence metric is based at least partly on a classifier that is trained using machine learning; the confidence metric is a statistical measure of the closeness between each data element of the environmental context data and a corresponding data element of the other context data; and/or at least two different data elements of the environmental context data are weighted differently in determining the confidence metric.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Traditional systems determine the location of a device based on a satellite-based navigation system such as the global positioning system (GPS) or through other techniques. Such information may be spoofed or otherwise falsified through manipulation of data and/or processes on a device. Accordingly, unscrupulous parties may modify a device to claim a false location in an attempt to gain unauthorized access to a secure area and/or secure data, or for other ends. By independently verifying a device's location based on environmental context data, implementations are able to identify instances of such falsification and deny access when appropriate. Accordingly, implementations reduce the risk of fraud, theft, unauthorized access, and/or other unfavorable outcomes that may result from the use of traditional location determination systems alone. Moreover, traditional systems expend processing capacity, memory, storage space, network bandwidth, and/or other computing resources to respond to and recover from instances of fraud due to location spoofing. By avoiding or mitigating the risk of fraud due to location spoofing, implementations avoid the expenditure of such resources, and thus make more efficient use of computing resources compared to traditional systems. Implementations also facilitate the detection of fraud. For example, if a location has been verified at least partly based on the environmental context data, then any subsequent simultaneous (and/or sufficiently far away) locations that are determined for the user and/or their user device can be flagged as fraudulent or spoofed locations, and may trigger additional verification/authentication requirements for that location.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
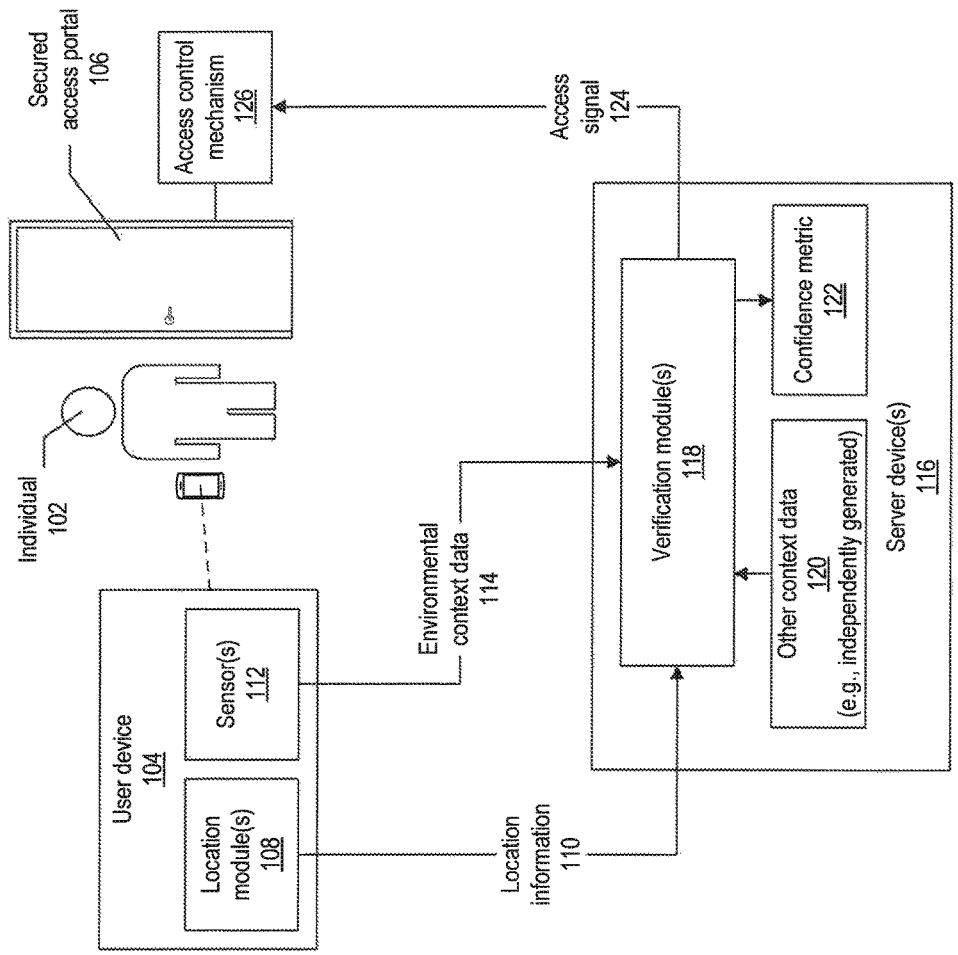
FIG. 1A depicts an example system for device location verification, according to implementations of the present disclosure.

Implementations of the present disclosure are directed to systems, devices, methods, and computer-readable media for determining and/or verifying the location of a device based on environmental data collected by the device. A device may provide location information describing its location that is determining using signals from a satellite-based navigation system or through other techniques. Environmental context data may also be received from the device, such data describing temperature, air pressure, air quality, pollen count, ambient light, and/or other characteristics of the environment in proximity to the device. In some implementations, the environmental context data may be generated by sensor(s) incorporated into the device. Implementations may compare the environmental context data to corresponding elements of other context data regarding the location. The other context data may be generated independently of the device to provide an environmental model of the location. Based on the comparison between the received environmental context data from the device and the other context data, a confidence metric may be determined that indicates a level of correspondence between the two sets of context data. Accordingly, the confidence metric may indicate a level of confidence that the devices communicated location is its actual location.

The confidence metric may be employed to make a security determination regarding a user of the device. For example, the confidence metric may be used to determine whether to provide access to a secure area, e.g., if the device is actually at a security door where the user is requesting ingress. As another example, the confidence metric may be used to determine whether to provide access to an application, or at least a portion of the application that provides access to sensitive information and/or high fraud-risk operations (e.g., such as funds transfers or other financial transactions). In some instances, the confidence metric may be used to determine whether a transaction is to proceed, e.g., based on a verification that the location of the device is at the point-of-sale (POS) terminal, automated teller machine (ATM), or other location where the transaction is being requested. In general, implementations employ environmental context data to independently verify that a device's purported, claimed, or advertised location is its actual location. Such verification may be employed to allow or deny access to secure areas and/or information. Verification may also be employed for other security determinations, such as user authentication.

Implementations employ environmental context data that describe current environmental conditions at a device. By comparing the environmental context data to expected context data, implementations may verify that the device's purported location is its actual location. For example, a device may claim that its GPS-based location is in Denver, Colo., USA, but implementations may determine a low confidence in this claim if: the current air pressure at the device indicates an altitude of only 30 feet above sea level, the humidity reported by the device is different than the currently reported weather conditions in Denver, and the air quality reported by the device more closely resembles the current or expected air quality of Los Angeles instead of Denver. In such instances, a determination may be made that the device is spoofing its location for some purpose, and decisions regarding secure access, user authentication, and/or other security determinations may take into account the low confidence location determination. Accordingly, implementations may reduce the risk of fraud, theft, user impersonation, or other activities that may lead to security breaches, funds misappropriation, or other types of harm to a user and/or organization.

FIG. 1A depicts an example system for device location verification, according to implementations of the present disclosure. As shown in the example of FIG. 1A, an individual 102 may own, operate, or otherwise be associated with a user device 104. The user device 104 may include any suitable type of computing device. In some instances, the user device 104 is a portable computing device such as a smartphone, tablet computer, wearable computer, implanted computer, automotive computer, portable gaming platform, and so forth, the location of which may change throughout the course of a day or other period of time as the individual 102 moves about. The user device 104 may also be a less portable type of computing device, such as a desktop computer, laptop computer, game console, smart appliance, and so forth.

In the example of FIG. 1A, the individual 102 has approached a secure access portal 106 such as a secured door. The individual 102 may employ an application executing on the user device 104 to request access to a secure area beyond the secured access portal 106. In some instances, the individual's approach to, or proximity to, the secured access portal 106 may be interpreted as a request for access. In some instances, the individual 102 may enter a command to a keypad located near the door, swipe a keycard through a card reader, position a radio frequency identification (RFID) fob near a transceiver at the door, or otherwise perform action(s) to request access through the secured access portal 106. The request may be to enter a secure area beyond the secured access portal 106, such as the individual's home, an office, an automated teller machine (ATM) vestibule, or a vehicle.

The user device 104 may execute one or more location modules 108 that determine a location of the user device 104. The location of the user device 104 may be determined using any suitable technique(s), to any appropriate degree of specificity. For example, the user device 104 may include location sensor(s), transceiver(s), and/or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite (IRNS) System receiver, and so forth. The location may also be determined through geolocation based on an internet protocol (IP) address of the user device 104. In some cases, the location of the user device 104 and/or the individual 102 may be determined based on previously collected information describing the user device 104 and/or the individual 102, such as a previously specified address of the individual's home, workplace, social network posts, or other information indicating the individual's presence at a location such as a restaurant, store, or other location, and so forth.

The location determined by the location module(s) 108 may be communicated as location information 110 to one or more verification modules 118 executing on one or more server devices 116. The server device(s) 116 may include any suitable number and type of computing device. In some examples, the location information 110 may be analyzed by the verification module(s) 118 to determine whether the individual 102 is to be permitted access to the secure area through the secured access portal 106. For example, in response to the individual's access request, the verification module(s) 118 may verify that the location of the user device 104 is actually at or near the secured access portal 106, to guard against the possibility of an unauthorized individual gaining access to the secure area. As another example, the verification module(s) 118 may verify that the location of the user device 104 is at a POS terminal or ATM where someone claiming to be the individual is requesting a transaction.

In some instances, the identity of the individual 102 may have been previously authenticated using one or more authentication techniques, through an application executing on the user device 104. Such authentication may include, but is not limited to, credential-based authentication using a login, password, PIN, knowledge-based question answers, and/or other types of credentials, token-based authentication (e.g., OAuth), biometric authentication, such as authentication based on fingerprints, retinal scans, heartbeat detection, neural activity (e.g., brain wave) patterns, voice print analysis, body chemistry measurement, facial recognition, and so forth.

In some instances, unauthorized individuals may try to gain unauthorized access to the secure area by falsifying or spoofing the location of the user device 104, e.g., such that the location information 110 indicates a different location than the actual location of the user device 104. The location may be falsified through modification of the operation of the location module(s) 108, modification of other hardware and/or software components of the user device 104, and/or modification of the communicated location information 110 itself. Implementations employ environmental context data 114 to verify the location of the user device 104 independently of the location information 110. In some implementations, the user device 104 includes one or more sensors 112 that generate environmental context data 114 that describes a current environmental context in proximity to the user device 104 at one or more times. The environmental context data 114 may include, but is not limited to, one or more of the following factors:

Temperature data generated by temperature sensor(s), describing the current temperature of the environment at or near the user device 104 using any suitable temperature scale.

Air pressure (e.g., barometric) data describing the current air pressure of the environment at or near the user device 104 using any suitable pressure scale. Air pressure data may indicate a current value of the air pressure and/or a direction of change, if any, in air pressure (e.g., increasing, decreasing, or substantially unchanging). Air pressure data may be generated by barometric sensor(s).

Air quality (e.g., pollution) data, describing a current presence and/or concentration of one or more chemical compounds in the air proximal to the user device 104. Air quality data may also describe the presence and/or concentration of particulates in the air, such as smog, soot, volcanic ash, smoke, and/so forth. Air quality data may be generated by sensor(s) configured to detect and/or measure the presence of chemical(s) and/or particles in the air.

Humidity data, describing a current humidity of the air proximal to the user device 104, e.g., an amount and/or concentration of water vapor in the air.

Pollen or dander data, describing a current presence and/or concentration of types of plant pollen and/or animal dander in the air proximal to the user device 104. Pollen and/or dander data may be generated by sensor(s) configured to detect and/or measure the presence of pollen and/or dander in the air.

Water quality data, describing the current presence and/or concentration of chemical compound(s) and/or particulate matter in water that is in proximity to the user device 104. The water may be in a body of water (e.g., lake, river, pond, puddle, etc.). The water may also be water falling as precipitation near or onto the user device 104, such as rain, snow, sleet, and so forth. The water may also be suspended in the air as fog, clouds, and so forth. Concentration of chemicals and/or particles may be described using any suitable unit of measure, such as parts per million, parts per billion, partial pressure, and so forth. Water quality data may be generated by sensor(s) configured to detect and/or measure the presence of chemical(s) and/or particles in water. Water quality data may also include water temperature, water pressure, or other characteristic(s) of nearby water.

Ambient light data, describing a current level of illumination detected at the user device 104. Ambient light may be described using any suitable unit of measure, such as lumens. Ambient light data may also include a description of one or more frequencies of light that comprise the illumination present at the user device 104. Light may be visible light (e.g., in the visible spectrum). Light may also include portion(s) of the electromagnetic spectrum outside the visible light portion of the spectrum, such as infrared, microwave, radio frequency, ultraviolet, X-rays, gamma rays, and so forth. Ambient light data may be generated by light sensor(s).

Ambient sound data, describing a current level of sound detected at the user device 104. Ambient sound may be described using any suitable unit of measure, such as decibels. Ambient sound data may also include a description of one or more frequencies of sound detected at the user device 104. Ambient sound data may also include a description of patterns of sound detected at the user device 104, such as voices, music, noises caused by automobiles, airplanes, animals, and/or other identifiable sounds. Ambient sound data may be generated by audio input sensor(s) such as microphone(s).

Other weather data, such as description of the wind speed, wind direction, precipitation (e.g., rain, sleet, snow, hail, lightning, thunder, storms, tornados, hurricanes, typhoons, etc.) in proximity to the user device 104. Weather data may be generated by sensor(s) configured to detect and/or analyze local weather conditions, e.g., by measuring wind speed and direction, precipitation, and so forth.

Seismic data, such as information regarding vibrations detected at the user device 104. Seismic data may be generated by haptic sensors that detect movements of the user device 104, such as accelerometers, gyroscopic sensors, and so forth.

Radiation data, such as a description of alpha radiation, beta radiation, gamma radiation, and/or other types of radiation detected at the user device 104. Radiation data may be generated by sensor(s), such as particle detectors, that are configured to detect and measure energetic particles (e.g., electrons, protons, photons, alpha particles, etc.) that impact or pass through the sensor(s).

Implementations may also employ any other suitable type of sensor(s) 112 for generating other appropriate types of environmental context data 114. Although FIG. 1A depicts the sensor(s) 112 as being a component of the user device 104, implementations are not so limited. In some instances, one or more sensors 112 may be external to the user device 104. The environmental context data 114 generated by such external sensor(s) 112 may be communicated to the server device(s) 116 using the user device 104 as an intermediary, or communicated (e.g., directly) without using the user device 104 as an intermediary. In instances where the environmental context data 114 is generated by external sensor(s) 112, the communicated data may include other information that enables the verification module(s) 118 to independently verify that the user device 104 was in proximity to the external sensor(s) 112 when the environmental context data 114 was generated, such that the environmental context data 114 describes the (e.g., current) environment in proximity to the user device 104.

The environmental context data 114 may be communicated from the user device 104 to the server device(s) 116 over one or more networks. The verification module(s) 118 may analyze the environmental context data 114 to determine a confidence metric 122. The confidence metric 112 may indicate a level of correspondence between the environment context data 114 and other context data 120 that is generated independently of the environment context data 114. The other context data 120 may also be described as baseline context data, given that it provides a baseline of typical value(s) of environment factors at or near the particular location, such as the typical illumination, temperature, air pressure, humidity, wind speed/direction, pollen count, and/or other factors at the location for the particular time of day and/or time of the year. If the confidence metric 112 is at least a predetermined threshold value, the verification module(s) 118 may infer that the user device 104 is actually at the purported location described in the location information 110. In such instances, the verification module(s) 118 may cause an access signal 124 to be communicated to cause an access control mechanism 126 to open the secured access portal 106 and permit the individual 102 to enter the secure area. If the confidence metric 112 is not at least the threshold value, the verification module(s) 118 may determine that the user device 104 is not actually at the purported location, and access may be denied.

The other context data 120 may be collected, generated, and/or received at the server device(s) 116 using one or more processes that operate independently of the generation of the environment context data 114. Accordingly, the other context data 120 may provide an independent, objective, and/or trusted measurement of the environment at the purported location indicated in the location information 110. In some instances, the other context data 120 may be current data that is generated and/or received during a time period that is approximately contemporaneous with the generation of the environmental context data 114. For example, the other context data 120 may include data that describes the current temperature, air pressure, air quality, water quality, ambient light, ambient noise, weather conditions, and/or other environmental conditions at various locations. In some instances, the other context data 120 may describe typical, average, and/or historical values of environmental data at various locations for particular times of data, times of the year, seasons, and so forth.

The other context data 120 may be generated by one or more sensors that are at various locations. Such sensors may be fixed, such as immobile weather monitoring devices, air quality monitoring devices, light sensors to measure ambient light conditions, microphones to collect ambient noise information, and so forth. The sensors may also be mobile, such as sensors in vehicles (e.g., automobiles, aircraft, satellites, dirigibles, drones, etc.). In some instances, the other context data 120 may be generated by sensors that are present in user devices other than the user device 104. Accordingly, implementations may employ accumulated context data from various sources to compare to the environmental context data 114 generated at the user device 104. In some instances, the other context data 120 may be received from an external (e.g., third party) service, such as a weather information service. In some instances, the other context data 120 may be retrieved from a knowledge base or other type of data storage. For example, the other context data 120 may include almanac data that describes the typical and/or average temperature, air pressure, precipitation, daylight hours, and/or other environmental characteristics of various locations at various times of data or times of the year.

The confidence metric 122 may indicate a degree of correspondence between each of one or more data elements of the environmental context data 114 and a corresponding element of the other context data 120. For example, the environmental context data 114 may include a current temperature (e.g., air temperature) in proximity to the user device 104, as measured by a thermometer, thermocouple sensor, and/or other temperature sensor 112 in the user device 104. The other context data 120 may include a data element that is the current temperature at the purported location of the user device 104, as measured, reported, and/or provided through a different sensor, a weather service, or other independent source(s). Alternatively, the other context data 120 may include a data element that describes the typical and/or average temperature or range of temperatures at the purposed location for the current day of the year and/or time of day. If the temperature described in the environmental context data 114 is close to the temperature (or within the temperature range) described in the other context data 120, the confidence metric 122 may indicate a high confidence that the purported location is the actual location of the user device 104. If the temperature described in the environmental context data 114 is not close to the temperature (or outside the temperature range) described in the other context data 120, the confidence metric 122 may indicate a low confidence that the purported location is the actual location of the user device 104.

As another example, the environmental context data 114 may include a measurement of the ambient light level at the user device 104, as measured by a light meter, camera, or other sensor 112. The other context data 120 may include a description of the daylight hours between sunrise and sunset at the purported location described by the location information 110. If the ambient light level measured at the user device 104 does not correspond to an expected light level at the current time and purported location, given the daylight hours described in the other context data 120, the confidence metric 122 may indicate a low confidence that the purported location is the actual location of the user device 104. In some implementations, the verification module(s) 118 may also take into account information indicating whether the user device 104 is indoors or outdoors, e.g., based on the location and/or other environmental context data 114. If the user device 104 is claiming to be at a location where the local time is noon, and the user device 104 is determined to be outside, the confidence metric 122 may be low if the environmental context data 114 indicates a current ambient light level that is low (e.g., darkness).

Such an analysis may be applied to any number of data elements present in the environmental context data 114. For example, the confidence metric 122 may indicate a degree of correspondence between the current temperature, air pressure, and pollen count described in the environmental context data 114 compared to the corresponding data elements in the other context data 120 for the purported location. In some implementations, the confidence metric 122 may be calculated as in Example Formula 1 below.

$$C = 1 - \frac{\sum_{i=0}^{n} \frac{\sqrt{(e_i - k_i)^2}}{e_i}}{n}$$ Example Formula 1

In Example Formula 1, C is the confidence metric 122, $e_i$ is the value of a data element of the environmental context data 114, and $k_i$ is the value of the corresponding data element in the other context data 120. The confidence metric 122 may be calculated as the sum, over any number n data elements present in the environmental context data 114, of the root-mean-square (RMS) difference of the corresponding data elements, normalized the value of the data element in the environmental context data 114 (e.g., e1) or the other context data 120 (e.g., k). The sum may be divided by the number of data elements n and subtracted from 1, such that the confidence metric 122 varies from 0 to 1, with 0 indicating the minimum level of correspondence and 1 indicating the maximum level of correspondence.

In Example Formula 1, each data element is weighted equally in the determination of the confidence metric 122. In some implementations, various data elements may be weighted differently in the determination of the confidence metric 122. For example, temperature data may be weighted more heavily than air pressure data or pollen count data. Example Formula 2 illustrates an example calculation of the confidence metric 122 that takes different data element weights into account.

$$C = 1 - \frac{\sum_{i=0}^{n} \frac{w_i \sqrt{(e_i - k_i)^2}}{e_i}}{n}$$ Example Formula 2

In Example Formula 2, is a weight of the particular data element. In this example, the sum of the weights $w_i$ may be 1 to provide normalization. In some implementations, the different weighting of different elements may be according to the accuracy and/or uncertainty in the measurement for each data element in the environmental context data 114 and/or other context data 120. For example, a temperature measurement may be weighted more heavily than pollen count, given that greater uncertainty of a pollen count measurement.

Implementations support the use of any suitable statistical measure of the aggregate difference or closeness between data elements of the environmental context data 114 and the other context data 120. In some implementations, machine learning (ML) techniques may be employed to determine the confidence metric 122. For example, one or more sets of environmental context data 114 may be tagged to indicate whether access is to be permitted or not based on each set of data. The tagged data may be used to train a classifier that operates to output an access decision (e.g., yes or no) based on subsequently received sets of environment context data 114. The results of the operation of the classifier may be analyzed and used to further train the classifier to make better access decisions based on received environmental context data 114. Implementations support the use of any appropriate ML techniques to determine a confidence metric 122, including supervised and unsupervised ML techniques. In some implementations, the confidence measure determined dynamically by leveraging ML techniques to determine the weights that would be (e.g., most) appropriate and/or (e.g., most) confidently applied, given a geographic location and/or previous verification attempts.

In some implementations, such as those that employ ML techniques, the confidence metric 122 may be a binary 0 or 1 output (e.g., deny access or allow access). Accordingly, the threshold for allowing access may be 1 or generally greater than 0. Implementations support the use of other threshold values. In implementations where the confidence metric 122 has a value ranging from 0 to 1, the threshold may be set somewhere between 0 and 1 (e.g., 0.8). The threshold may be adjusted by an operator to adjust access decisions based on varying degrees of confidence in the purported location of the user device 104.

In some implementations, additional information may be employed to confirm that the individual 102 is at the secured access portal 106 when requesting access. For example, one or more external sensors (e.g., camera, heat sensors, etc.) may be positioned in proximity to the secured access portal 106 to confirm the presence of the individual 102 at or near the secured access portal 106. As another example, one or more weight sensors may be positioned in locations where the individual 102 is likely to be when requesting access. The additional sensor data may be further employed to verify that the individual 102 is present at the secured access portal 106, and that the present individual 102 exhibits appropriate characteristics with respect to height, weight, and so forth.

The implementations depicted in FIG. 1A may be similarly applied to control access to, or use of, a smart appliance, vehicle, or other object. For example, the purported location of the user device 104 and/or individual 102 may be checked to verify that the location is the same as that the appliance, vehicle, or other object. In such examples, the access signal 124 may be sent to an onboard computer in the appliance or vehicle, and the onboard computer may respond to the access signal 124 by activating the appliance or vehicle. The implementations depicted in FIG. 1A may be similarly applied to authorize a transaction requested by the individual 102, such as a purchase, funds withdrawal, funds transfer, and so forth. In such instances, the purported location of the user device 104 and/or individual 102 may be checked to verify that the location is the same as the POS terminal, ATM, vending machine, service kiosk, or other object where the individual 102 is requesting a transaction. The access signal 124 may be sent to the POS terminal, ATM, vending machine, service kiosk, or other object to authorize the transaction requested by the individual 102.

Figure 1B:
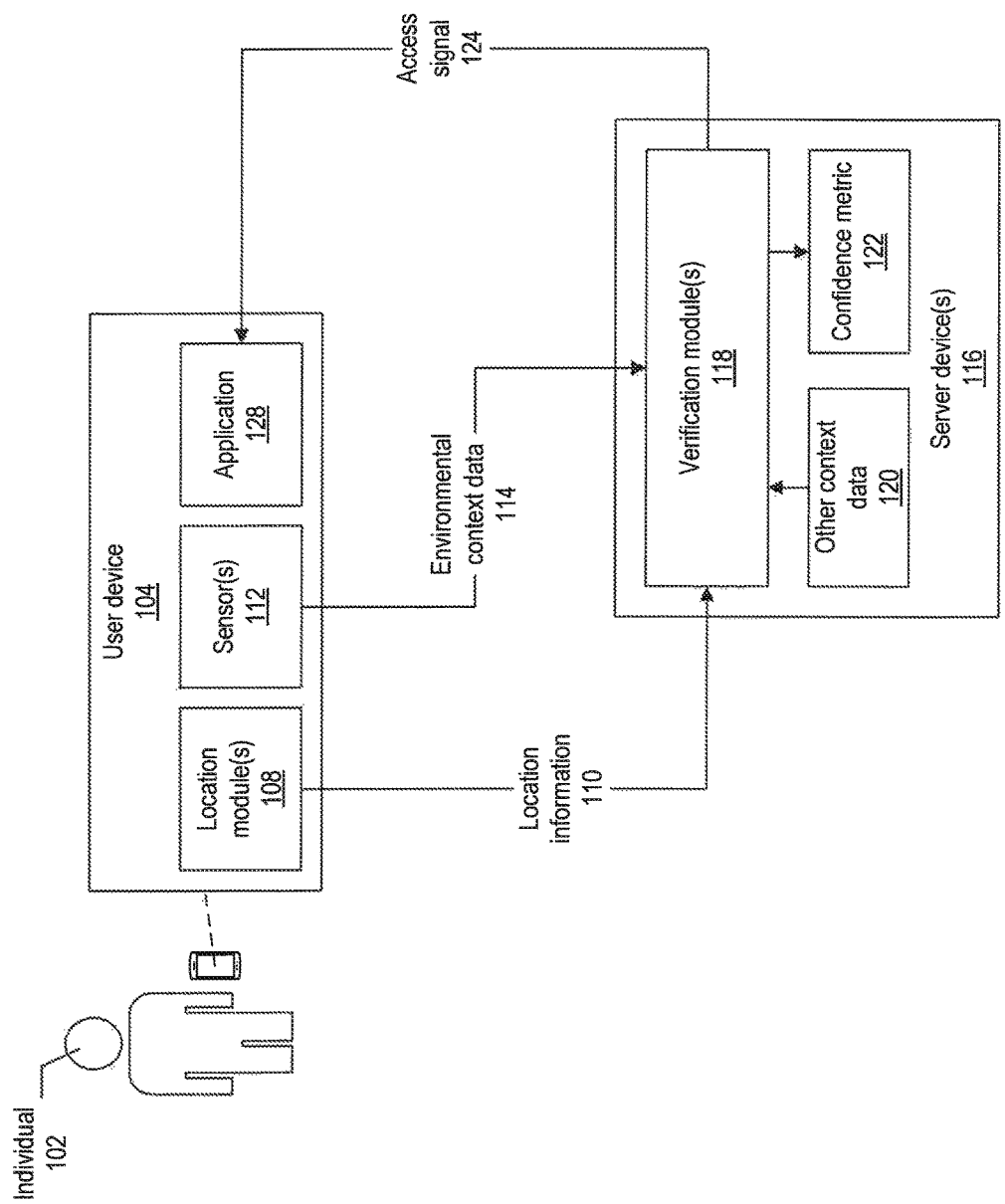
FIG. 1B depicts an example system for device location verification, according to implementations of the present disclosure.

FIG. 1B depicts an example system for device location verification, according to implementations of the present disclosure. Elements of FIG. 1B may be configured similarly to like-numbered elements of FIG. 1A, and/or perform operations that are similar to those of like-numbered elements of FIG. 1A. In the example of FIG. 1B, the user device 104 executes an application 128. The application 128 may be any appropriate type of application, configured to enable any appropriate type of functionality, operations, information access, communications, and so forth. For example, the application 128 may be a client application (e.g., app) for financial services, which enables the individual 102 to access account information, request funds transfers, make purchases, and so forth.

In the example of FIG. 1B, the location of the user device 104 is verified using the environmental context data 114 to ensure that the purported location indicated by the location information 110 is the actual location of the user device 104. If there is sufficient confidence that the purported location is accurate (e.g., if the confidence metric 122 exceeds a threshold), the access signal 124 may be sent to provide access to the application 128 and/or provide access to a secure portion of the application 128 (e.g., features of the application 128 that provide access to sensitive information or operations). In some instances, the access signal 124 may be sent to provide access to (e.g., unlock) the user device 104. In this way, implementations may provide an additional check to help prevent fraudulent use of the application 128 and/or user device 104, in addition to user authentication based on credentials, biometric data, and so forth. For example, if the user device 104 is purporting its location to be in Shanghai, China, but its actual location is associated with environmental context data 114 that is different than independently reported context data for Shanghai, this may indicate that someone is attempting to use the user device 104 and/or application 128 for fraudulent activities. Implementations may block such activities by denying access to the user device 104 and/or application 128.

Figure 2:
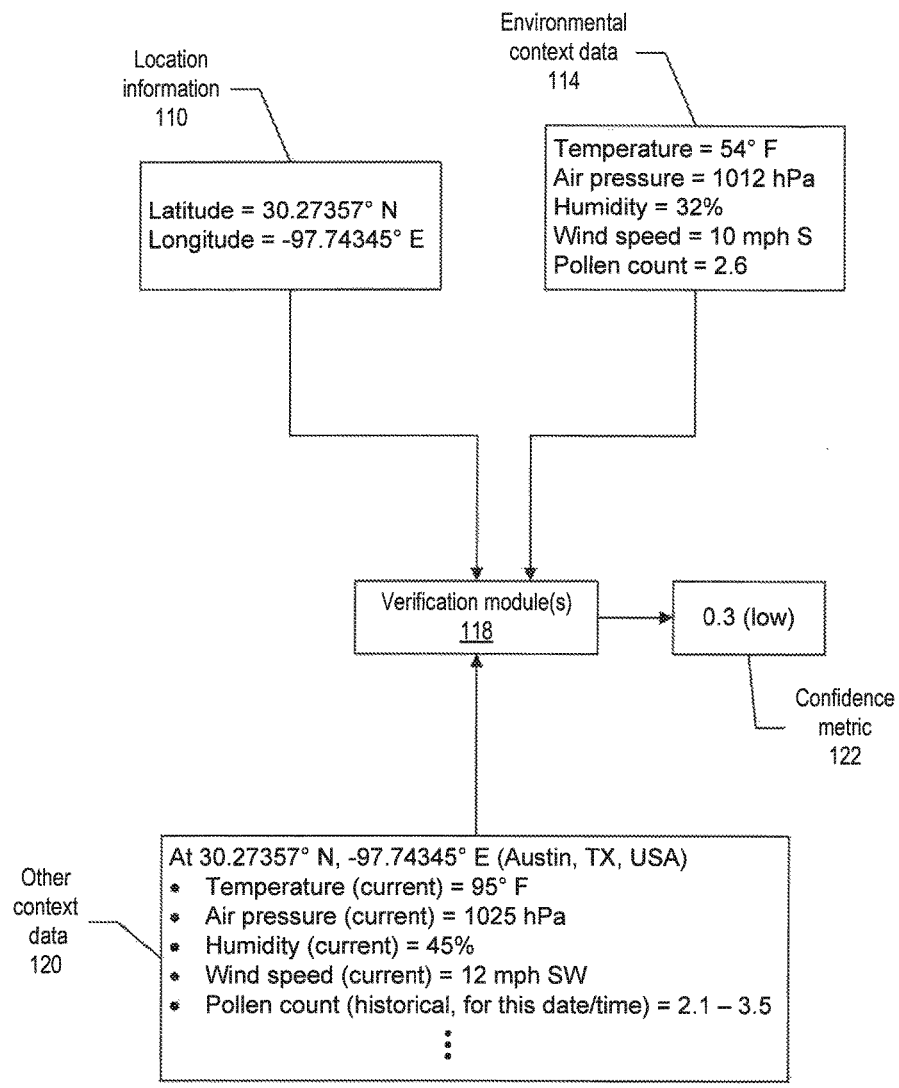
FIG. 2 depicts an example of device location verification based on environmental context data, according to implementations of the present disclosure.

FIG. 2 depicts an example of device location verification based on environmental context data, according to implementations of the present disclosure. In the example of FIG. 2, the user device 104 has provided location information 110 that purports a particular location. In this example, the location is described using geographic coordinates (e.g., latitude and longitude). Implementations support other ways of describing location, such as a street address, description of city, state, county, province, prefecture, neighborhood, country, region, and so forth. Location may also be described as distance and/or direction from an identified reference location. In the example, the user device 104 has also provided environmental context data 114 describing the temperature, air pressure, humidity, wind speed, and pollen count at (or proximal to) the user device 104.

The location information 110 and environmental context data 114 may be received and analyzed by the verification module(s) 118, with reference to the other context data 120, to determine a confidence metric 122. In the example of FIG. 2, the verification module(s) 118 have accessed other context data 120 for the location described in the location information 110, including a current (or recent) measurement of temperature, air pressure, humidity, and wind speed. In this example, the other context data 120 also provides a typical range of pollen count for the current date and/or time, for the particular location, based on historical patterns of pollen count. Through a comparison of the other context data 120 to the environmental context data 114 received from the user device 104, the verification module(s) 118 have determined a low confidence metric 122, e.g., given the discrepancies between the data elements for temperature, air pressure, humidity, and/or wind speed and direction. The low confidence metric 122 may lead to a denial of the individual's requested access to a secure area, as described with reference to FIG. 1A. In some examples, as in the example of FIG. 1B, the low confidence metric 122 may lead to a denial of access to the application 128, sensitive (e.g., high fraud risk) features of the application 128, and/or the user device 104 as a whole.

The other context data 120 may provide an environmental model of a location, the model developed over time based on various context data that is received describing the location. The confidence metric 122 may measure the extent to which the received environmental context data 114 agrees (or disagrees) with the model for the purported location described in the location information 110. Accordingly, implementations provide a technique for independently verifying the location of the user device 104 and/or the individual 102 based on a comparison of the environmental model to the environmental context data 114 collected by the sensor(s) 112 of the user device 104. The location verification may be employed to determine access to a secure area or secure information, such as sensitive portions of an application, secure data, secure network access, secure devices, and so forth. The location verification may also be employed in other contexts where independent verification of a device location may be advantageous to prevent instances of fraud, theft, and/or other events.

Figure 3:
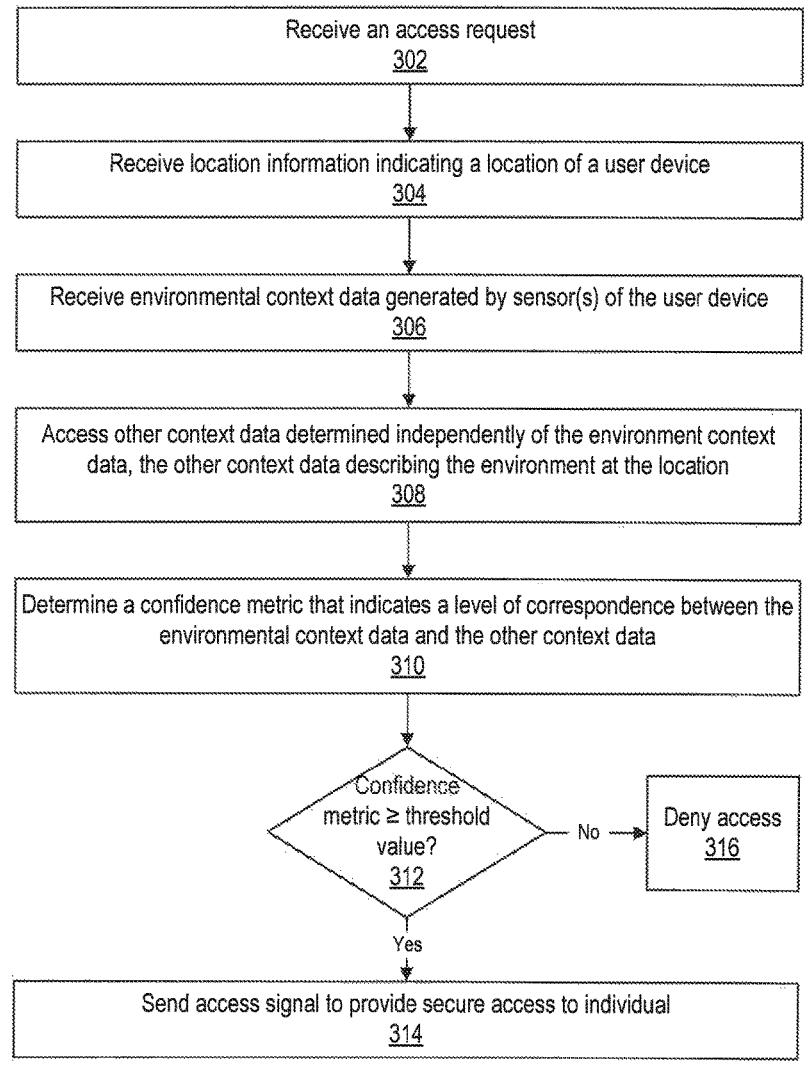
FIG. 3 depicts a flow diagram of an example process for device location verification, according to implementations of the present disclosure.

FIG. 3 depicts a flow diagram of an example process for device location verification, according to implementations of the present disclosure. Operations of the process may be performed by one or more of the location module(s) 108, the verification module(s) 118, the application 128, and/or other software module(s) executing on the user device 104, the server device(s) 116, the access control mechanism 126, or elsewhere.

An access request may be received (302) as described above. The location information 110 may be received (304) indicating a purported location of the user device 104. Environmental context data 114 may be received (306). As described above, one or more data elements of environmental context data 114 may be generated by sensor(s) 112 of the user device 104. The other context data 120 may be accessed (308), providing an environmental model of the location described in the location information 110. As described above, the other context data 120 may be determined independently of the environmental context data 114 and/or independently of the user device 104. A confidence metric 122 may be determined (310) that indicates a level of correspondence between the environmental context data 114 and the other context data 120. The confidence metric 122 may be compared (312) to a (e.g., predetermined) threshold value. If the confidence metric 122 is at least the threshold value, access may be permitted (314). In such instances, an access signal 124 may be sent (314) to provide the requested access to the individual 102. If the confidence metric 122 is below threshold, access may be denied (316) and the access signal 124 may not be sent.

In some implementations, as described above, sensing technologies embedded in computing devices, such as portable devices, enable systems that identify potential health threats for individuals. The health threats may be related to the environment where the individuals are located. For example, a determination may be made that a location that exhibits high levels of allergens (e.g., animal dander, industrial pollutants, pollen, etc.) in the air, water, or otherwise in the environment, where such allergens could negatively affect the health of individuals. Location based identification of threats may at a macro level (e.g., for a state, city, county, etc.), a micro level (e.g., for a particular address, postal code, etc.), or at any other suitable level of specificity with regard to location. In this way, implementations associate locations with threats to individuals based on environmental factors such as pollen or industrial waste, and/or based on personal factors such as smoking, perfume or cologne used, or other aspects of individual lifestyle.

The factors for authenticating an individual may be based on who the individual is, what the individual knows, what the individual has in their possession (or in their proximity), and/or what is in the individual's environment. Authentication that includes environment-based location verification may provide for greater confidence in authentication in instances where an individual is travelling for any amount of time away from their typical location. Environment-based location verification also prevents spoofing the GPS or other traditional location determination techniques as a single factor, reduces false positives in authentication and/or location determination, enables sales or other transactions, and reduces friction. Environment-based location verification also reduces false positives and helps to remove friction. As described above, each location may have its own expected environmental fingerprint based on the environment factors expected to be present at that location. Factors may include but are not limited to altitude, pollen count, air quality metrics (e.g., based on dust, pollen, emissions, etc.), temperature, air pressure, current daylight, oxygen concentration (e.g., thick or thin), oceanic influence on the air (e.g., salt content in the air), and so forth. Through the use of an environmental fingerprint, implementations substantially reduce the occurrence of false positives and enable more valid transactions to be processed as expected, while also identifying instances of GPS spoofing or other location spoofing.

Figure 4:
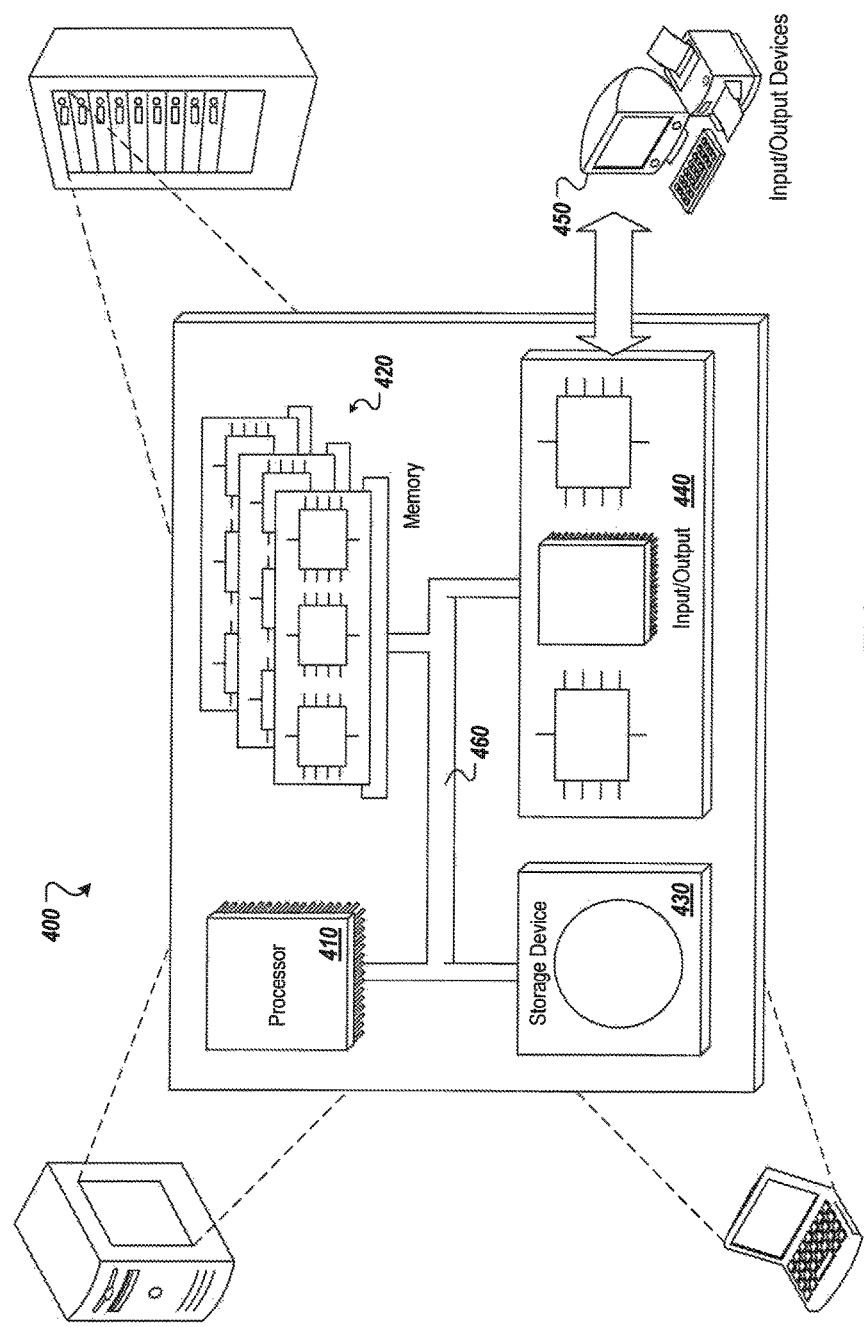
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device 104, the server device(s) 116, the access control mechanism 126, and/or other device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   at least one processor; and
   a memory communicatively coupled to the at least one processor, the memory storing instructions which, when executed by the at least one processor, cause the at least one processor to perform operations comprising:
   receiving location information indicating a location of a user device;
   receiving environmental context data generated by one or more sensors, the environmental context data describing one or more environment factors in proximity to the user device; and
   determining a correspondence between the environmental context data and baseline context data that describes a typical value, at the location, for at least one of the one or more environment factors and, based on the determined correspondence, transmitting an access signal that indicates authorization to access secure information through the user device.

2. The system of claim 1, wherein the access signal indicates authorization to access at least one secure feature of an application that executes on the user device.

3. The system of claim 2, wherein the at least one secure feature of the application includes a secure feature to request a transaction.

4. The system of claim 1, wherein:
   the secure information is stored on the user device; and
   the access signal indicates authorization to access the secure information on the user device.

5. The system of claim 1, wherein:
   the secure information is stored on a remote device; and
   the access signal indicates authorization to access the secure information over a network connection to the remote device.

6. The system of claim 1, wherein the one or more environment factors include one or more of temperature data, air pressure data, air quality data, pollen data, and ambient light data.

7. The system of claim 1, wherein the one or more sensors include at least one sensor that is a component of the user device.

8. The system of claim 1, wherein determining the correspondence between the environmental context data and the baseline context data is based at least partly on a classifier that is trained using machine learning.

9. The system of claim 1, wherein determining the correspondence between the environmental context data and baseline context data includes:
   determining a confidence metric that based on a level of correspondence between each of the one or more environmental factors and the corresponding typical value included in the baseline context data; and determining the correspondence based on the confidence metric being at least a threshold value.

10. The system of claim 9, wherein the confidence metric is a statistical measure of closeness between each environmental factor of the environmental context data and the typical value of the respective environmental factor included in the baseline context data.

11. The system of claim 9, wherein at least two different environmental factors of the environmental context data are weighted differently in determining the confidence metric.

12. A computer-implemented method performed by at least one processor, the method comprising:

receiving, by the at least one processor, location information indicating a location of a user device;

receiving, by the at least one processor, environmental context data generated by one or more sensors, the environmental context data describing one or more environment factors in proximity to the user device; and determining, by the at least one processor, a correspondence between the environmental context data and baseline context data that describes a typical value, at the location, for at least one of the one or more environment factors and, based on the determined correspondence, transmitting an access signal that indicates authorization to access secure information through the user device.

13. The method of claim 12, wherein the access signal indicates authorization to access at least one secure feature of an application that executes on the user device.

14. The method of claim 13, wherein the at least one secure feature of the application includes a secure feature to request a transaction.

15. The method of claim 12, wherein:
the secure information is stored on the user device; and
the access signal indicates authorization to access the secure information on the user device.

16. The method of claim 12, wherein:
the secure information is stored on a remote device; and
the access signal indicates authorization to access the secure information over a network connection to the remote device.

17. The method of claim 12, wherein the one or more environment factors include one or more of temperature data, air pressure data, air quality data, pollen data, and ambient light data.

18. The method of claim 12, wherein the one or more sensors include at least one sensor that is a component of the user device.

19. The method of claim 12, wherein determining the correspondence between the environmental context data and the baseline context data is based at least partly on a classifier that is trained using machine learning.

20. One or more non-transitory computer-readable storage media storage instructions which, when executed by at least one processor, cause the at least one processor to perform operations comprising:

receiving location information indicating a location of a user device;

receiving environmental context data generated by one or more sensors, the environmental context data describing one or more environment factors in proximity to the user device; and determining a correspondence between the environmental context data and baseline context data that describes a typical value, at the location, for at least one of the one or more environment factors and, based on the determined correspondence, transmitting an access signal that indicates authorization to access secure information through the user device.

* * * * *